United States Patent
Flippo et al.

(10) Patent No.: US 6,342,548 B2
(45) Date of Patent: *Jan. 29, 2002

(54) FLAME RETARDANT POLYAMIDE COMPOSITION

(75) Inventors: Peter Flippo, Best; Johannes Tijssen, Beek; Chi K. Sham, Schinnen; Augustinus E. H. de Keijzer, Sittard; Richerdus J. M. Hulskotte, Schinnen, all of (NL)

(73) Assignee: DSM N.V., Heerlen (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/862,959

(22) Filed: Jun. 2, 1997

Related U.S. Application Data

(63) Continuation of application No. PCT/NL95/00400, filed on Nov. 23, 1995.

(30) Foreign Application Priority Data

Dec. 1, 1994 (NL) ............................................. 9401088

(51) Int. Cl.⁷ ............................................. C08K 5/349
(52) U.S. Cl. ...................................................... 524/100
(58) Field of Search .......................................... 524/100

(56) References Cited

U.S. PATENT DOCUMENTS

| 3,660,344 A | * | 5/1972 | Michael et al. .............. 524/100 |
| 3,663,495 A | * | 5/1972 | Michael et al. .............. 524/100 |
| 4,866,114 A | * | 9/1989 | Taubitz et al. ............... 524/101 |
| 5,182,336 A | * | 1/1993 | Abe et al. ..................... 525/132 |
| 5,985,960 A | * | 11/1999 | Keijzer et al. .............. 524/100 |
| 6,051,708 A | * | 4/2000 | Keijzer et al. .............. 524/100 |

FOREIGN PATENT DOCUMENTS

EP   A-055893   11/1981

* cited by examiner

*Primary Examiner*—Veronica P. Hoke

(57) ABSTRACT

The invention is concerned with a flame retardant polyamide composition in which melam is the flame retardant component. Very advantageous are polyamide compositions having a melting temperature of at least 260° C. preferably 280° C. in which for the first time with a non-halogen containing flame retardant at relatively low concentration high flame retardancy ratings can be obtained.

Preferably the melam contains less then 2.0% by weight residual catalyst.

The compositions are useful for cablecoatings, tubing, films, fibers and electric or electronic components.

14 Claims, No Drawings

FLAME RETARDANT POLYAMIDE COMPOSITION

This is a continuation of International Appln. No. PCT/NL95/00400 filed Nov. 23, 1995.

The present invention relates to a flame retardant polyamide composition that contains a triazine compound as flame retardant. The flame retarding effect of triazine compounds is thought to originate from the decomposition of these compounds at heating into nitrogen containing gaseous compounds that act as flame extinguishers. Melamine and melamine cyanurate have found widespread application in flame retardant plastics compositions. There are some publications in which more complicated melamine compounds and melamine salts are disclosed as flame retardant. However except melamine phosphate none of these compounds has found technical application.

The triazine compounds melamine and melamine cyanurate have the practical advantages that already at relatively low concentration adequate flame retardancy can be obtained without the use of synergists, no discoloration of the composition occurs under normal conditions and no corrosion of the processing apparatus is observed. However melamine and to a lesser extend melamine cyanurate have the disadvantage that during processing melamine is deposited in the mould, which may cause obstruction of the ventilation ducts and makes regular stops of the production process necessary to clean the mould. Although melamine cyanurate does show this disadvantageous phenomenon of mould deposit to a lesser extend than melamine, its use is further limited due to the fact that at higher temperatures, for instance at temperatures higher than 270° C., the polyamide melts containing melamine cyanurate are unstable and show a decrease in melt viscosity. At temperatures of 290° C. and higher in many cases gas evolution is so high that processing of compositions with melamine cyanurate is practically impossible. Therefore in the new class of high temperature engineering polyamides, for instance polyamide 4,6, melting temperature 290° C., and the copolyamides, for instance PA 6,6/6,T/6,I with even higher melting temperatures, melamine cyanurate cannot be used and one has to rely on the halogenated organic compounds, for instance brominated polystyrene, to flame retard these polyamides. Compositions with these flame retardants usually are discolored and show low values for the comparative tracking index (CTI), which is a characteristic for the usefullness of polyamide compositions in applications such as for instance connectors and switches.

Object of the invention is therefore a flame retardant polyamide composition with a triazine compound as flame retardant, that possesses the favorable properties of melamine and melamine cyanurate but does not show the above mentioned disadvantages.

The inventors have found that the above requirements are completely fulfilled if the triazine compound as flame retardant is melam.

Melam is the condensation product of 2 molecules melamine. In German Patent DE-C-1694254 (priority 16.3.1968) the potential use of melam as flame retardant in polyamides is already mentioned as one of the compounds of the groups of melamine, melam and melamine-cyanurate and melamine derivates. Also in the publications NL-A-6915620, EP-A-0055893 en DE-A-3023965 melam is mentioned as possible flame retardant component in polyamide compositions. However all examples in these references have been limited to melamine and/or melamine cyanurate, and no single indication can be found of the extraordinary properties of melam for the solution of the technical problems mentioned above that are inherent to the use of melamine and melamine cyanurate as flame retardant in polyamide compositions.

Melam can be obtained by condensation of melamine in the presence of a catalyst. A known process is that described by V. A. Gal'perin et.al. in Zhurnal Organesheskoi Khimii, 7 (11), 2431–32 (1971) in which zincchloride is used as a catalyst. However as it is nearly impossible to remove the zincchloride sufficiently from the melam, the melam obtained by this process is hardly useful as flame retardant in processing caused by the presence of the residual catalyst in the melam. Therefore preference is given to a process in which melam is obtained, having a residual catalyst content that is not deliterious for the polyamide under processing conditions. Generally the residual catalyst content should be less than 2 wt %, preferably the catalyst content is less than 1 wt %, more preferable less than 0.5 wt % of the melam, best results are obtained if less than 0.2 wt % catalyst residue is present in the melam. Very suitable catalysts are organic acids or the melamine and/or ammonium salts thereof. Preferably the organic acid is a sulphonic acid for instance paratoluenesulphonic acid, that is present in a mole ration or preferably 0.1–3.0 to melamine. The reaction mixture is heated several hours while being stirred and under a nitrogen atmosphere. The temperature is chosen above 220°C. preferably between 280 and 320° C. After cooling the melam salt of the sulphonic acid is obtained, and reacted with base into melam and freed from catalyst and base rests through repeated washing with water. As a base for instance ammonia, sodium hydroxide and/or sodium bicarbonate can be used.

In the condensation process generally also minor amounts of higher condensation products for instance melem and melon can be formed. The presence of these products however does not influence significantly the effect of the melam. Therefore if in this application the wording melam is used, then also melam containing minor amounts of higher condenstes of melamine is comprised. Minor has herein the meaning of in such quantity present that the special properties of melam as flame retardant for polyamide are not suppressed.

The polyamide of the polyamide composition is in principle not limited to a small group of polyamides. Both polyamides based on dicarboxylic acids and diamines and those derived from amino acids or lactams can be used in the compositions.

Examples of dicarboxylic acids are aliphatic dicarboxylic acids for instance oxalic acid, succinic acid, adipic acid and sebacinic acid, aromatic dicarbyoxylic acids, for instance tere- and isophthalic acid, naphthalene dicarboxylic acid and diphenylene dicarboxylic acid.

Examples of diamines are aliphatic diamines, for instance 1,4-diaminobutane, 1,6-diaminohexane, 1,5-methylpentanediamine and 2,2,4-trimethylhexanediamine, cycloaliphatic diamines, for instance diaminodicyclohexylmethane, and aromatic diamines, for instance p-phenylenediamine.

Useful polyamides are for instance, polypyrollidone (PA-4), polycaprolactam (PA-6), polycapryllactam (PA-8), polytetramethylene adipamide, (PA-4,6), poly(hexamethylene adipamide), (PA-6,6), poly(hexamethylene isophthalamide), (PA-6, I), poly(hexamethylene terephtalamide), (PA-6T), poly(metaxylylene adipamide), (PA-MXD,6), etc. and copolymers thereof for instance 6,6/6,T, 6,6/6,I, 6, 6/6,I/6,T etc.

Especially advantageous are polyamides having a melting temperture higher than 240° C., preferably higher than 260° C. It is even for the first time that for polyamides having a melting temperature of higher than 270° C. a triazine derived flame retardant is demonstrated under practical conditions. Therefore poly(hoxamethylene adipamide), poly (tetramethylene adipamide), the copolyamides having a high melting temperature, for instance the copolyamides based on an aliphatic diamine, an aliphatic dicarboxylic acid and at least one aromatic dicarboxylic acid, are especially suited for the composition according to the invention. The molecular weight of the polyamide may vary over a wide range, but is preferably chosen such that processing in the melt is possible and that articles obtained from the melt have adequate mechanical properties. Generally the weight averaged molecular weight will be chosen in the range of 8000–60.000.

Depending on the required level of flame retardancy and the requirements with respect to mechanical properties the melam content of the composition may vary over a wide range, for instance between 1 and 40% by weight of the total composition. Below 1% the effect on flame retardancy is in general too small, above 40% the mechanical properties in general will be negatively influenced. Preferably the melam content is between 2 and 35% by weight, with more preference between 3 and 30% by weight. The low melam contents preferably are used in combination with a second flame retardant compound, for instance a halogen containing compound, such as brominated polystyrene or polyepoxyde. Other second compounds may be compounds having a suppressing effect on dripping of the composition in case of fire, for instance a low melting glass, examples thereof are leadborate and alkaliphosphate glass having a melting range of 200-14 600° C. , preferably 300–500° C., a zincborate preferably anhydrous zincborate, or an organic or inorganic fibrous material, for example fibrillar polytetrafluoroethylene and wollastonite. Special advantages are found in combinations with metaloxides, for instance antimony oxide and zinc oxide, which are especially useful in glass fibre reinforced compositions. However levels of these compounds should be kept low if a high arc tracking resistance is required.

The composition of the invention may further contain the usual additives, for instance stabilizers, colorants, processing aids, for instance mould release agents and flow improvers, fillers and the already mentioned reinforcing fibrous materials, heat and/or electricity conducting materials and other polymers, for instance (modified) elastomeric polymers for impact resistance improvement. Also chain extending agents for instance diepoxides may be present.

The composition according to the invention exhibits also excellent electrical properties. So is the arc tracking index, CTI, on a very high level and does no appreciable electric corrosion due to the flame retardant occur. Therefore electrical and electronic parts, obtained with the composition according to the invention, will fulfill the highest requirements. Especially electrical and electronic parts obtained from the polyamide compositions according the invention and having a melting temperature of at least 265° C., preferably at least 275° C., are exceptionally suited to be used in the surface mounting technique, SMT, in which they have to withstand very high temperatures during for instance infrared or hot air soldering. Examples of such parts are SIMM connectors (Single in line memory module).

The compositions can be obtained from the components by known methods as such. For instance the components may be dryblended and consequently fed into a meltmixing apparatus, for instance a Brabender kneader or an extruder. Also the components can be directly fed into a melt mixing apparatus and dosed together or separately. Preference is given to an extruder as meltmixing device. In that case the composition is obtained in pellets that can be used for further processing, for instance in injection moulding, extrusion or blow molding. Preferably the meltmixing is performed in an inert gas atmosphere and the materials are dried before mixing.

For a high effectivity of the melam as flame retardant it is advantageous to disperse the melam very finely into the polyamide matrix and to use herefor a double screw extruder. The particle size of the melam is chosen preferably as low as possible, for instance the particle size is <100 $\mu$m, preferably <50 $\mu$m with more preference <20 $\mu$m. Most preferred is a particle size <10 $\mu$m. Especially if the polyamide composition is used in filaments, films and coating this small particle size is preferred.

The invention is further illustrated by the following experiments, without however being limited thereto.

EXAMPLE I

Preparation of melam

In a glass reactor of 2 liter, that was placed in an oven at 295° C., 252 gram melamine and 174 gram paratoluene sulphonic acid were heated under continuous stirring. Ammonia generated during the reaction was removed by a nitrogen gas stream. After 2 hours at 290° C., the contents of the reactor were cooled and washed with in total 1 liter 3% ammonia. After filtration and drying 235 gram melam was obtained. The paratoluene sulfonic acid content in the melam was less than 0.08% by weight. The melamine content was about 1.5% by weight.

In the experiments disclosed hereafter the following materials have been used:

polyamide-6: Akulon K123 of DSM polyamide-6,6: Akulon S228 of DSM polyamide-4,6: Stanly K5-300 of DSM copolyamide 6,6/6,T/6,I: Amodel A-1133 HS of Amoco, containing 33% by weight glass fibre melamine cyanurate: standard grade of DSM for unfilled PA (d99<50 $\mu$m), and ultrafine grade for glass fibre reinforced PA.

melam: obtained by the process of Example I, particle size distribution: D95<137 $\mu$m, d75<40 $\mu$m in Ex. II, III and VIII, and d99<35 $\mu$m in IV-VII.

glassfibre: chopped strands 8045 of PPG in PA-6 and PA-6,6; R73WX1 of Owens Corning in PA-4,6 mica: Aspanger SFG 20 of Aspanger

The compounds have been processed on a ZSK 30/33D extruder and a ZSK-25/38D for the highest melting polyamides with a screw speed of 200 rpm resp. 270 rpm and a throughput rate of θ 10 kg/hr resp. 20 kg/hr. The setting temperatures were respectively unfilled PA-6: 250–270° C.

unfilled PA-6,6: 270–280° C.

mineral/glassfibre reinforced PA-6 and 6,6:270–280° C.

unreinforced PA 4,6: 300–315° C.

glasfibre reinforced PA-4,6: 300–315° C. The components have been dry blended after careful drying and have been fed to the extruder via the hopper. In the preparation of the glassfibre reinforced compositions side feed has been used.

The compositions have been injection moulded on an Arburg injection moulding machine into UL-94 test bars of 1.6 mm thickness. Cylinder temperatures were respectively:

unreinforced PA-6: 250–270° C.
unreinforced PA-6,6: 270–280° C.
unreinforced PA-4,6: 310–320° C.
mineral/glassfibre reinforced PA-6 and PA-6,6: 270–280° C.
glassfibre reinforced PA-4,6: 300–315° C.
glassfibre reinforced copolyamide 6,6/6,T/6,I 330° C.

The mould temperature was 85° C. for PA-6 and PA-6,6, 120° C. for PA-4,6 and 140° C. for PA-6,6/6,T/6,I.

Flame retardant properties have been determined according to:
the Underwriters Laboratories procedure UL-94 at 1.6 mm and classified as
N.C. (Non Classified).
V-2 average burning time less then 25 seconds (self extinguishing) and burning drip
V-1 average burning times less than 25 seconds (self extinguishing), no burning drip,
V-0 average burning time less than 5 seconds, no burning drip (averaged over 5 test species).
the glowwire fire index at 3.0 mm and 1.0 mm thickness according to (IEC 695-2-1).
Mechanical properties have been determined.
tensile properties according to ISO R 527 (after conditioning at 23° C. and 50% Rel.Humidity).
notched Izod according to ISO 180/1A (23° C., 50% RH)
melt viscosity on a RMS 800 apparatus at 270° C., strain 0.8% and 1 rad/sec The amount of mould deposit located near the ventilation ducts of the mould has been determined after 50 shots during injection moulding of the 1.6 mm UL95 test bars by visual judgement. A qualitative analysis was made by High Performance Liquid Chromatography, HPLC The arc tracking index, was determined as comparative tracking index, CTI, according to UL-746, IEC 112.

EXAMPLE II AND COMPARATIVE EXPERIMENT A

Polyamide-6 containing different quantities, 5.0, 7.5 and 10.0 wt %, melam (Ex. II)or melaminecyanurate (Exp. A) has been extruded into pellets and processed by injection moulding into test bars. Flame retardant properties have been determined as well as mechanical properties. In all cases a V-0 classification and glowwire 960° C. (1 mm) was measured. Also the mechanical properties did not show significant differences.

The melt viscosity at 270° C. of the compositions containing 7.5 wt % melam and melaminecyanurate resp. have been determined at different residence times. The followings results have been found.

|  | $\eta_3/\eta_9$ | $\eta_3/\eta_{15}$ |  |
|---|---|---|---|
| 92.5 wt % PA.6 + 7.5 wt % mecy | 2.0 | 3.8 | (exp. A) |
| 92.5 wt % PA-6 + 7.5 wt % Melam | 1.05 | 1.1 | (ex.II) |

$\eta_3$, $\eta_9$ and $\eta_{15}$ are the meltviscosity after resp. 3, 9 and 15 minutes. It is clear that the polyamide composition with melam exhibits a superior meltstability at 270° C. over the composition with melamine cyanurate. This difference is even more pronounced at higher melt temperatures.

EXAMPLE III AND COMPARATIVE EXPERIMENT B

Polyamide 6.6 containing different quantities, 4.0, 6.0 and 7.5 wt %, of melam (Ex. III) and melaminecyanurate (Exp. B) was extruded into pellets and injection moulded into testbars. The mould of the injection moulding machine was checked after 50 shots for mould deposit. Of the test bars flame retarding and mechanical properties have been determined.

Results: Flame retardancy of all compositions was V-0 and glowwire 960° C. (1.0 mm). The E-modulus of the compositions according to the invention was on average 10% higher than the compositions containing melamine cyanurate 4.0 GPa vs. 3.65 GPa.

The other properties were not different.

The composition containing melaminecyanurate (Comparative Experiment B) caused considerable mould deposit near the ventilation ducts. This mould deposit was much less, although still observable, in the case of the composition according to the invention. The mould deposit consisted in both cases essentially of melamine. Some melaminecyanurate (5%) and melam (about 10%) could be analyzed in the mould deposit of resp. the Comparative Experiment B and the example III. The minor mould deposit (90% melamine) in the case of the melam containing composition can be explained by the rest melamine content (1.5 wt %) of the melam used.

EXAMPLE IV AND COMPARATIVE EXPERIMENT C

Polyamide 6,6 was blended with glassfibre and melam at different concentrations. Compositions containing 20% by weight glassfibre and 10% by weight melam were already flame extinguishing (V-2) and with 20 and 30% by weight melam a glowwire rating of 960° C. at resp. 3.0 and 1.0 mm was obtained, showing the effectiveness of melam in glassfibre reinforced polyamide 6,6.

CTI values as high as 500 Volt have been measured. In a Comparative Experiment C an attempt was made to produce the corresponding compositions with melamine cyanurate. No regular pellets could be obtained due to foaming of the composition.

EXAMPLE V

Polyamide 4.6 was blended with different amounts of glassfibre and melam. Results with respect to the UL-94 flame retarding test and CTI values are given in the next table.

| PA 4,6 p.b.w. | glassfibre p.b.w. | melam p.b.w. | UL-94 | CTI [V] |
|---|---|---|---|---|
| 95 | 0 | 5 | V-2 | >600 |
| 92.5 | 0 | 7.5 | V-2 | >600 |
| 90 | 0 | 10 | V-0 | >600 |
| 80 | 10 | 10 | V-2 | >600 |
| 70 | 20 | 10 | V-2 | 500 |
| 50 | 30 | 20 | V-2 | 450 |

Without additional flame retardant components a V-2 classification could already be obtained for glassfibre reinforced compositions, containing as little as 10 wt % melam.

The non-reinforced composition is already V-0 with 10% by weight melam. Which makes it very suitable for applications in for instance cable coatings, tubing laminates, connectors and housings. The CTI value of 450–500 Volt for glassfibre reinforced flame retardant polyamide 4,6 according to the invention is a significant improvement over the 250V for flame retardant glass fibre reinforced polyamide compositions containing about 18 wt % brominated polystyrene and about 7% by weight antimonytrioxide as flame retardant (Stanyl®TE 250 F6 of DSM).

EXAMPLE VI

Amodel A-1133 HS a copolyamide of 6,6, 6,T and 6,I containing 33% by weight glass fibre reinforcement was blended with 10% by weight melam and injection moulded. Melttemperature 330° C. and mould temperature 140° C.

Flame retardancy was as good as in the case of glass fibre reinforced polyamide 4,6. The CTI had the same high value.

EXAMPLE VII

The composition of example V containing 30% by weight glass fibre and 20% by weight melam and the composition of example VI have been injection moulded into a SIMM connector with a length of about 15 cm at injection moulding conditions of melttemperature 315 and 330° C. and mould temperature 90° C. and 140° C. respectively.

The obtained connectors showed no discoloration. Connectors obtained from corresponding compositions containing a brominated styrene and antimonytrioxide as flame retardant (Stanyl®TE250F6 and Amodel®AF-1133V-0 resp.) showed discoloration.

EXAMPLE VIII AND COMPARATIVE EXPERIMENT D

Example III was repeated and 10% by weight melam obtained by the method of Example I was blended with the polyamide-6,6 (Ex. VIII). In a Comparative Experiment D instead of the melam of Ex. I a melam containing about 2% by weight paratoluene sulphonic acid was used.

Instead of a V-0 classification (Example VII) only a V-2 rating was obtained in comparative experiment D.

What is claimed is:

1. A polyamide composition comprising a polyamide; and a flame retardant which is melam.

2. A polyamide composition according to claim 1, wherein the composition contains between 1 and 40% by weight of melam.

3. A polyamide composition according to claim 1, wherein the polyamide is selected from the group consisting of polyamide 4,6 and polyamides derived from at least one aromatic diamine or at least one aromatic dicarboxylic acid.

4. An electric or electronic part comprising the composition according to any one of claims 1, 2, and 3.

5. An electric or electronic part comprising the composition according to claim 1.

6. Tubing comprising the composition according to any one of the claims 1, 2, and 3.

7. Coating comprising the composition according to anyone of the claims 1, 2, and 3.

8. Film consisting of the composition according to any one of the claims 1, 2, and 3.

9. Fibre consisting of the composition according to any one of the claims 1, 2, and 3.

10. An electric or electronic part according to claim 4, wherein said part is a connector for a single in line memory module.

11. A polyamide composition that is free of organic halogen compounds which consists of at least one polyamide having a melting temperature greater than 260° C., and melam in an amount of 1–40% by weight of said composition.

12. A polyamide composition comprising melam and a polyamide consisting essentially of polyamide 4,6, the polyamide composition being free of organic halogen compounds.

13. The polyamide composition of claim 12 wherein the composition has a melting point greater than 270° C.

14. A polyamide composition as claimed in claim 1, wherein the polyamide has a melting temperature higher than 260°C.

* * * * *